United States Patent
Da Silva Neto

(10) Patent No.: US 7,693,688 B2
(45) Date of Patent: Apr. 6, 2010

(54) FIELD BUS DISTRIBUTION UNIT

(75) Inventor: Eugenio Ferreira Da Silva Neto, Biel-Benken (CH)

(73) Assignee: Endress + Hauser Process Solutions AG, Reinach (CH)

( * ) Notice: Subject to any disclaimer, the term of this patent is extended or adjusted under 35 U.S.C. 154(b) by 3 days.

(21) Appl. No.: 12/230,516

(22) Filed: Aug. 29, 2008

(65) Prior Publication Data

US 2009/0076629 A1 Mar. 19, 2009

Related U.S. Application Data

(63) Continuation of application No. 10/562,499, filed as application No. PCT/EP2004/006705 on Jun. 22, 2004, now Pat. No. 7,502,707.

(30) Foreign Application Priority Data

Jun. 26, 2003 (DE) .................. 103 28 906

(51) Int. Cl.
*G05B 15/00* (2006.01)
*G06F 17/40* (2006.01)
*G06F 19/00* (2006.01)

(52) U.S. Cl. .............. 702/188; 340/870.01; 702/1; 702/127; 702/187

(58) Field of Classification Search ........... 340/870.01; 702/1, 127, 187, 188
See application file for complete search history.

(56) References Cited

U.S. PATENT DOCUMENTS

| | | | |
|---|---|---|---|
| 4,106,092 A * | 8/1978 | Millers, II | ............... 710/64 |
| 4,831,558 A | 5/1989 | Shoup | |
| 4,949,299 A | 8/1990 | Pickett | |
| 5,134,574 A | 7/1992 | Beaverstock | |
| 5,485,400 A | 1/1996 | Warrior | |
| 5,530,702 A | 6/1996 | Palmer | |
| 5,825,664 A | 10/1998 | Warrior | |
| 6,035,247 A | 3/2000 | Sugihara | |
| 6,192,281 B1 | 2/2001 | Brown | |
| 6,496,892 B1 | 12/2002 | Lake | |
| 6,531,982 B1 * | 3/2003 | White et al. | ........... 342/357.09 |
| 6,667,690 B2 * | 12/2003 | Durej et al. | ............... 340/572.1 |
| 6,803,854 B1 * | 10/2004 | Adams et al. | ............... 340/531 |
| 6,873,259 B2 * | 3/2005 | Teraura | ............... 340/572.1 |
| 6,968,994 B1 | 11/2005 | Ashwood Smith | |
| 7,609,159 B2 * | 10/2009 | Benson et al. | ............... 340/540 |

(Continued)

FOREIGN PATENT DOCUMENTS

DE 19811583 9/1999

(Continued)

OTHER PUBLICATIONS

Fisher-Rosemount Systems, Inc. "Cost and Analysis Cable Study using Foundation Fieldbus Instruments", Jan. 2002, XP002310659.

*Primary Examiner*—Edward R Cosimano
(74) *Attorney, Agent, or Firm*—Bacon & Thomas, PLLC

(57) ABSTRACT

A field bus distribution unit (VE) designed for use in process automation technology involving several field devices. The unit is equipped with a microcontroller μC, which is connected to the field bus (FB) and transmits device-specific information of the field devices that are connected to a field bus distribution unit (VE).

4 Claims, 1 Drawing Sheet

U.S. PATENT DOCUMENTS

| | | | |
|---|---|---|---|
| 2002/0065577 A1* | 5/2002 | Teraura et al. | 700/226 |
| 2003/0042316 A1* | 3/2003 | Teraura | 235/487 |
| 2003/0137396 A1* | 7/2003 | Durej et al. | 340/3.5 |
| 2004/0248617 A1 | 12/2004 | Oba | |
| 2005/0027828 A1 | 2/2005 | Yamazaki | |
| 2006/0291657 A1* | 12/2006 | Benson et al. | 380/270 |
| 2007/0002139 A1* | 1/2007 | Benson et al. | 348/143 |
| 2007/0002140 A1* | 1/2007 | Benson et al. | 348/143 |
| 2007/0008410 A1* | 1/2007 | Benson et al. | 348/143 |
| 2007/0030143 A1* | 2/2007 | Benson et al. | 340/508 |
| 2007/0182544 A1* | 8/2007 | Benson et al. | 340/521 |

FOREIGN PATENT DOCUMENTS

| | | |
|---|---|---|
| DE | 19857649 | 6/2000 |
| DE | 20007904 U | 9/2001 |
| DE | 10107208 | 10/2001 |
| EP | 0994350 | 4/2000 |
| EP | 1099991 | 5/2001 |
| EP | 1265118 | 12/2002 |
| EP | 1404062 | 3/2004 |
| GB | 2 358 487 A | 7/2001 |
| WO | WO 03/054573 A1 * | 7/2003 |

* cited by examiner

US 7,693,688 B2

FIELD BUS DISTRIBUTION UNIT

CROSS-REFERENCE TO RELATED APPLICATION

This application is a Continuation Application which claims the benefit of U.S. patent application Ser. No. 10/562,499, which was filed on 27 Dec. 2005, now U.S. Pat. No. 7,502,707, which is the U.S. National Stage proceeding of PCT/EP2004/006705, which was filed on Jun. 22, 2004, which claims the benefit of German Application DE 103 28 906.2, which was filed on Jun. 26, 2003.

FIELD OF THE INVENTION

The invention relates to a field bus distribution unit for connecting a field bus of process information technology with a plurality of field devices.

BACKGROUND OF THE INVENTION

In process automation technology, field devices are often used, which are connected with superordinated units via a field bus.

Field devices serve generally for registering and/or influencing process variables.

Examples of such field devices are fill level meters, mass flow meters, pressure and temperature measuring devices, pH-redox measuring devices, conductivity measuring devices, etc., which, as measuring devices, register the corresponding process variables fill level, flow, pressure, temperature, pH-value, and conductivity. A large number of such field devices are manufactured and sold by the firm Endress+Hauser®.

The superordinated units serve for process visualization, process control, as well as for interacting with the field devices attached to the field bus.

Examples of field bus systems are Profibus®, Foundation® Fieldbus, etc.

Via the field bus, not only measured values but also a multiplicity of different kinds of information can be exchanged between the field device and a superordinated unit. Thus, for instance, device specific information can be stored in the field device and called-up as required. Such device-specific information can include location information, start-up information, service information, etc. A storing of device-specific information in the field device is, however, only possible, once the field device has been installed on the field bus and is ready for operation. The input of this information can, on the one hand, be done at the device itself, with the help of a display and keyboard, or, on the other hand, such can be done from a superordinated unit.

As a rule, device-specific information (location information and start-up information) arises at the installation of the field device of concern. In this case, a technician must cumbersomely input this information via the keyboard at the field device or e.g. forward such to appropriate operating personnel, in the case of the superordinated unit (control room). As a rule, the devices are not yet operational at the installation, i.e. they first have to be initialized. This means, however, that the mentioned information can only be stored in the field device after a delay. Because of this delay, it becomes possible that erroneous information becomes stored in the field device.

Likewise problematic is the storing of service information, when the relevant field device is malfunctioning.

Furthermore, in the case of a device replacement, all information stored in the device is lost.

SUMMARY OF THE INVENTION

An object of the invention, therefore, it to provide a field bus distribution unit, which permits device-specific information to be reliably available during installation, and in the case of replacement, of field devices.

An essential idea of the invention is to provide in a field bus distribution unit a microcontroller, which serves for the transmission of device-specific device information.

In order to be able to register, in simple manner, device-specific information, the microcontroller is connected with a reader module for chip-tags. Such chip-tags are widely used and serve for simple and cost-favorable storage of information.

In a basic example, the chip-tags are RFID-tags.

These chip-tags can be provided e.g. on the connecting cables for the field devices. In this case, e.g. location information remains available, even in the case of replacement of a field device.

The device-specific information can involve location information, ordering codes, device history, etc.

In a further development of the invention, the microcontroller is connected with a GPS module. In this way, the field bus distribution unit can be quickly and reliably located, and not all field devices connected to the field bus distribution unit need their own GPS module. As a rule, the location information of the field bus distribution unit is sufficient, in order also to uniquely locate the field devices situated mostly in the immediate vicinity of the field bus distribution unit.

BRIEF DESCRIPTION OF THE DRAWINGS

The invention will now be explained in greater detail on the basis of an example of an embodiment illustrated in the drawing, the figures of which show as follows.

DESCRIPTION OF THE PREFERRED EMBODIMENTS

Figure 1:
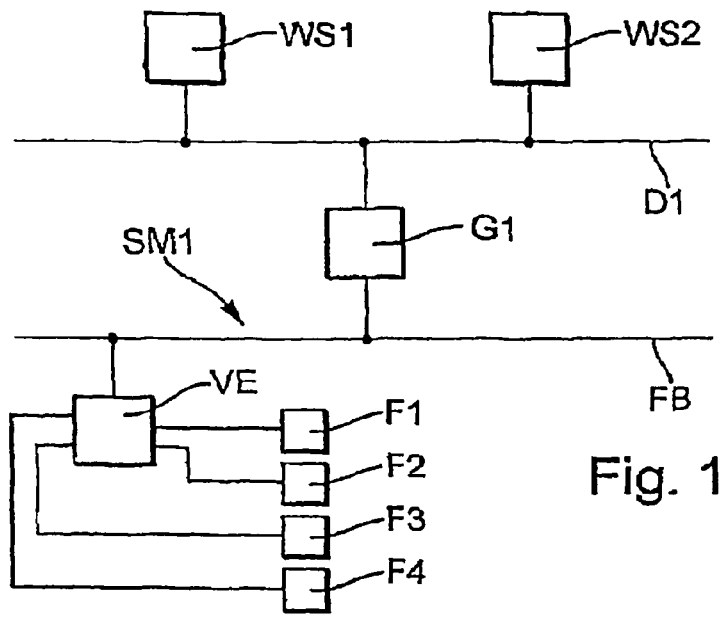
FIG. 1 schematic illustration of a field bus system.

FIG. 1 shows a field bus system in greater detail. Attached to a data bus D1 are a plurality of computer units, workstations WS1, WS2. These computer units serve as process control systems. They are used for process visualization, process monitoring and engineering, as well as for interacting with and monitoring individual field devices. Data bus D1 works e.g. according to the Profibus FMS standard, or according to the HSE (High Speed Ethernet) standard of Foundation® Fieldbus. Via a gateway G1, which is also referred to as a linking device or as a segment coupler, the data bus D1 is connected with a field bus segment SM1, which is composed, essentially, of a field bus distribution unit VE and a plurality of field devices F1, F2, F3 and F4. The field bus distribution unit VE is connected via a field bus FB with the gateway G1. The field devices are connected to the field bus distribution unit VE.

Via the field bus system, the field devices F1, F2, F3 and F4 can exchange data with the computer units WS1, WS2.

Figure 2:
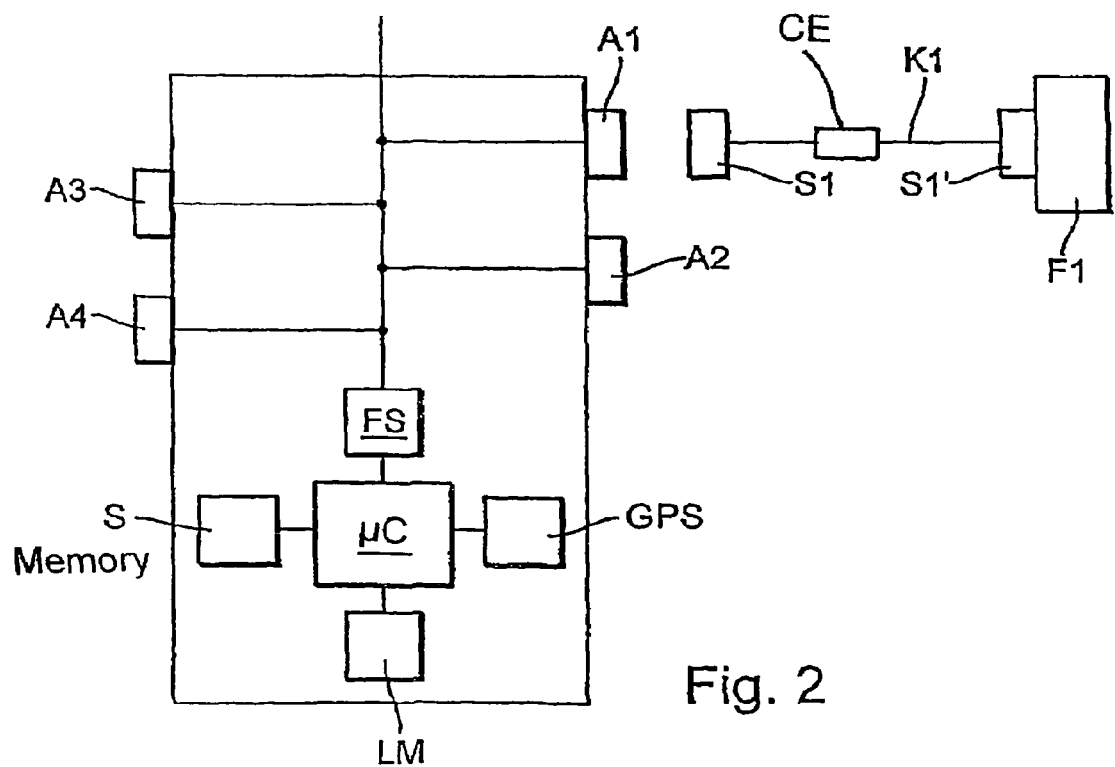
FIG. 2 schematic illustration of a field bus distribution unit of the invention.

FIG. 2 shows the field bus distribution unit in more detail. The field bus distribution unit VE includes a conventional field bus distribution unit, which, beyond that, additionally includes a microcontroller μC, a memory S, a GPS-module GPS and a reader module LM. The microcontroller μC is connected with the field bus FB via a field bus interface FS. Additionally, the field bus distribution unit VE has four connectors A1, A2, A3, A4, which are connectable to the various field devices. Illustrated by way of example, is the connection to the field device F1 using a cable K1. Cable K1 has plugs, respectively S1, S1', at both ends. Plug S1 serves for connection with the connector A1. Plug S1' serves for connection with the field device.

The function of the invention will now be explained in greater detail. Present on the connecting cable K1 is a chip-tag CE, in which device-specific information is stored. This chip-tag CE can be provided directly on the connecting cable K1, or on the plug S1. The chip-tags CE are passive units without their own energy supplies. Serving for read-out of the information stored in the chip-tag CE is the reader module LM. It transmits also the energy needed for the read-out. A transmission of information between chip-tag CE and reader module LM is only possible, when the chip-tag CE is located within range of the reader module LM. As a rule, the chip-tag CE is arranged on the front end of the connecting cable K1, as near as possible to the reader module LM. If device-specific information is needed in the superordinated units WS1 or WS2, as the case may be, then a corresponding query is directed to the field bus distribution unit VE. Thereupon, the reader module LM reads from the corresponding chip-tag CE and transmits the desired information.

In a further development of the invention, the microcontroller μC is connected with a GPS module, which makes location-specific information available. As a rule, the field devices connected to a field bus distribution unit VE are provided on a special process component, so that the location information of the distributer unit is also sufficient for the location information of the connected field devices. In this way, current location information is available for all field devices F1-F4, without such field devices themselves needing GPS modules.

Additionally, the field bus distributer unit is connected with a memory S, in which all device-specific information can be stored. A significant advantage of the invention is that location-specific information, as well as device-specific information, such as e.g. device history, are not lost upon a replacement of a field device, despite the replacement of the field device. Also, the storage of the device-specific information is possible in the case of a field device which is not yet ready for operation. The desired information is transmitted during installation of the field device into the corresponding chip-tag CE by a service technician using a writer module (not shown in more detail).

Additionally, the invention also contributes to an increased process safety, since information can be stored in the chip-tag CE for the attached field device. If an incorrect field device is attached to the cable K1, this can be easily be discovered by comparison of the data stored in the chip-tag CE and that made available by the field device.

The invention enables, in simple and cost-favorable manner, both call-up and storage of device-specific data.

I claim:

1. A field bus distribution unit for connecting a field bus with a plurality of field devices, comprising:
    a microcontroller, which is connected with the field bus;
    a reader module for chip-tags; and
    a distribution unit to which the field devices are connected via connecting cables, wherein:
    device-specific information for the field devices is stored in the chip-tags and, said chip-tags being provided by said cables to the field devices;
    the field bus serves for transmitting device-specific information of the field devices connected to said distribution unit; and
    upon query of a superordinated unit to said distribution unit, said reader module reads-out the chip-tag associated with a field device and transmits desired information to the superordinated unit, wherein:
    said microcontroller is connected with a GPS-module.

2. The field bus distribution unit as claimed in claim 1, wherein: the chip-tags are RF/ID-tags.

3. The field bus distribution unit as claimed in claim 1, wherein:
    said device-specific information for a field device includes location information, order code, device history.

4. The field bus distribution unit as claimed in claim 1, wherein:
    field bus works according to one of the field bus standards (HART®, Profibus®, Foundation® Fieldbus).

* * * * *